L. A. MENGES AND W. W. SIMPSON.
SHUTTER CONSTRUCTION FOR MOTOR VEHICLE RADIATORS.
APPLICATION FILED JAN. 23, 1920.
1,379,644.
Patented May 31, 1921.
2 SHEETS—SHEET 1.
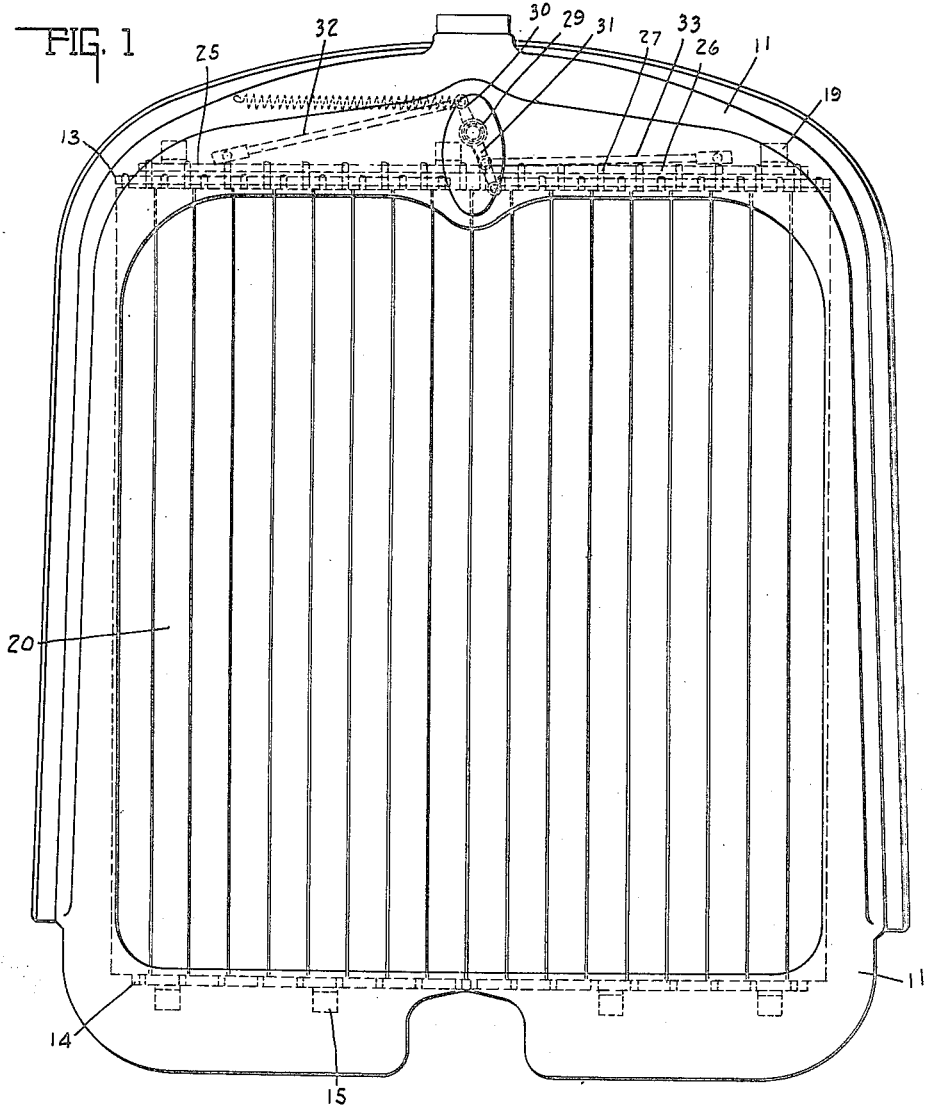
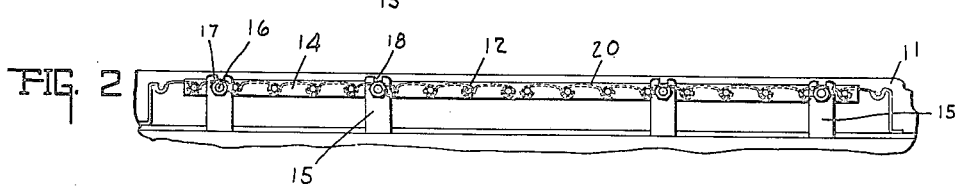
INVENTOR.
LUTHER A. MENGES.
WARREN W. SIMPSON.
BY
*[signature]*
ATTORNEYS L. A. MENGES AND W. W. SIMPSON.
SHUTTER CONSTRUCTION FOR MOTOR VEHICLE RADIATORS.
APPLICATION FILED JAN. 23, 1920.
1,379,644.
Patented May 31, 1921.
2 SHEETS—SHEET 2.
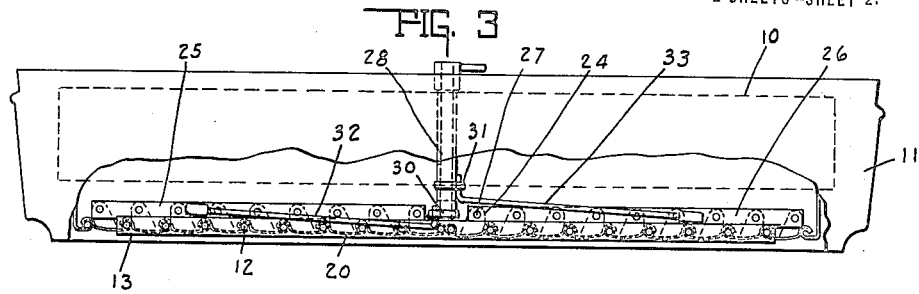
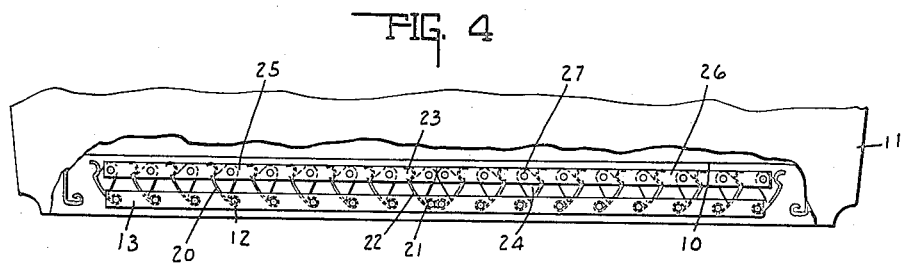
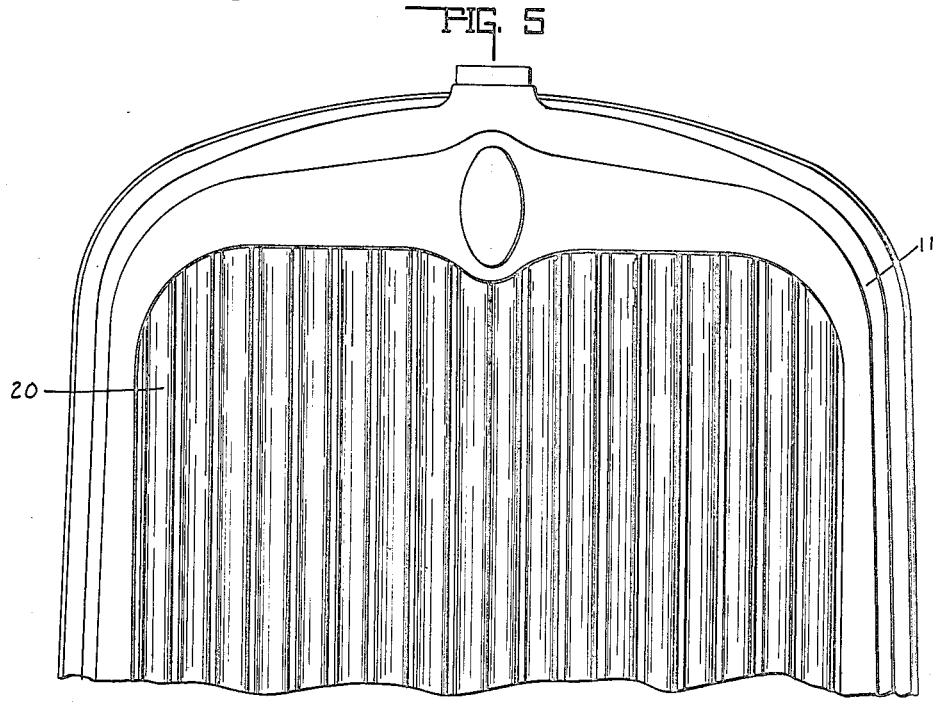
INVENTOR.
LUTHER A. MENGES.
WARREN W. SIMPSON.
BY
ATTORNEYS

UNITED STATES PATENT OFFICE.

LUTHER A. MENGES AND WARREN W. SIMPSON, OF INDIANAPOLIS, INDIANA, ASSIGNORS TO LA FAYETTE MOTORS COMPANY, OF INDIANAPOLIS, INDIANA, A CORPORATION.

SHUTTER CONSTRUCTION FOR MOTOR-VEHICLE RADIATORS.

1,379,644.  Specification of Letters Patent.  Patented May 31, 1921.

Application filed January 23, 1920. Serial No. 353,564.

*To all whom it may concern:*

Be it known that we, LUTHER A. MENGES and WARREN W. SIMPSON, citizens of the United States, and residents of Indianapolis, county of Marion, and State of Indiana, have invented a certain new and useful Shutter Construction for Motor-Vehicle Radiators; and we do hereby declare that the following is a full, clear, and exact description thereof, reference being had to the accompanying drawings, in which like numerals refer to like parts.

The chief object of this invention is to provide a motor vehicle and the like with an improved shutter arrangement for the radiator of said vehicle, wherein the shutters interlock when moved to the closed position, and wherein the shutters not only control the air passing through the radiator, but also are adapted to protect the radiator core positioned behind the same from casual injury.

Another object of the invention is to pivot said shutters upon vertical axes and arrange the same so that the shutters upon one-half of the radiator will deflect the air passing therethrough to one side of the radiator and engine, while the remaining shutters deflect the air in an opposite direction to the other side of the engine. The vertical arrangement of said shutters permits any object which may engage thereon to slide downwardly until near the base of said shutters, from whence it will drop beneath the car, which could not occur if the shutters were arranged to pivot upon a horizontal axis.

A further feature of the invention consists in pivoting the shutters upon one edge thereof and positioning said pivot edge within the radiator shell, so that said shutters in all positions will have no portion thereof extending beyond said shell, thereby preventing casual injury or bending of the shutters.

The full nature of the invention will be understood from the accompanying drawings and the following description and claims.

In the drawings, which are made a part of this application, Figure 1 is a front elevational view of a radiator shell showing the shutters positioned upon the same and in the closed position, certain of the parts being shown in dotted lines. Fig. 2 is a bottom plan view looking upwardly in Fig. 1 showing the method of supporting the shutter frame upon the radiator shell. Fig. 3 is a top plan view of the invention showing the shutters and the actuating parts in closed position. Fig. 4 is a view similar to Fig. 3 and shows the shutters in open position. Fig. 5 is an elevational view showing the shutters in the open position illustrated in Fig. 4.

This invention relates to a radiator shutter of the type wherein individual shutters are pivotally supported at one edge, and all of said shutters being operable by a single actuating means, the shutter construction being a part of the radiator shell. Radiator shutters as constructed heretofore have embodied these features just mentioned, either singly or in combination, and this invention is an improvement upon the same.

In the drawings there is shown the usual radiator core 10 and radiator shell 11, the latter supporting the shutter frame. Said frame comprises a plurality of vertically extending rods 12 mounted at both ends upon an upper and a lower transverse frame bar 13 and 14 respectively. The lower frame bar 14 is herein shown in Figs. 1 and 2 supported by said shell and spaced therefrom by a plurality of suitable bracket means 15, said bar being suitably secured thereto by any preferred means, such as the bolts 16 and the nuts 17. The bracket 15 is herein shown provided with a slot 18 in which the bolt is slidably adjusted. A plurality of upper brackets 19 similarly support in adjustable relation the upper bar frame 13. It will be understood that the shutter frame is adjustable toward and away from the radiator shell and is secured thereto by the bolt and nut means heretofore described.

Upon each vertically extending rod 12 there is pivotally supported a shutter blank 20. Each shutter blank is formed of an elongated strip of metal having one longitudinal edge curled to form a pivotal socket 21 through which the pivot rod extends and by which the shutter is pivotally supported upon the shutter frame. The blade portion 22 of said shutter is preferably of curvilinear cross section, as shown clearly in Fig. 4. The opposite longitudinal edge of said shutter blank is curved oppositely to the curvature of said blade portion to form a locking edge portion 23, said edge portion being so formed that when the shutters are in closed position, the portion 23 engages the socket portion 22 of the adjacent shutter so that said shutters form a dust proof joint. Said shutters when in closed position also effectively prevent rain, snow or sleet from passing through the same and collecting in the interstices of the radiator core.

The means for pivoting said shutters to position the same comprises suitable upwardly and rearwardly extending ear portions 24, herein shown formed integral with said shutter blanks. These ear portions are preferably formed upon the upper edge of said blanks, and the actuating mechanism associated therewith is positioned adjacent the same and behind the radiator shell so as to be invisible from the exterior thereof, Although said actuating mechanism could be positioned beneath the shutter frame and still be invisible, it is preferred to position the same above said frame to prevent the possibility of dirt, dust and the like from collecting in said actuating parts.

The actuating mechanism associated with said ears and pivotally connected therewith comprises a pair of transverse bars herein shown positioned above said upper bar frame 13 and parallel thereto. The actuating bars 25 and 26 have a plurality of pivot holes formed therein, said holes being adapted to receive pivot pins 27 secured to said ears and projecting upwardly therefrom. It will be understood that said ears support said actuating bars, as shown in Fig. 1. When said bars are slid transversely of the shutter frame, the motion thereof is transmitted through said ears to the shutters pivoted upon the rods 12, and in this manner the position of the shutters may be varied as desired. Suitable means for sliding said actuating bars comprises a rock shaft 28 adapted to be actuated by any preferred means, not shown, the same if desired extending rearwardly toward the driver's seat of the motor vehicle so as to be readily accessible to the driver. Positioned upon the forward end of said rock shaft is a lever arm 29 having oppositely extending ends 30 and 31. To the lever end 30 is suitably secured one end of the link 32, the other end of said link being suitably secured to the actuating bar 25. Similarly the actuating bar 26 is actuated by a link 33 to the lever end 31. As shown in Fig. 4, when said bars are moved transversely of said frame and in opposite directions until the adjacent ends of said bars abut each other, said shutters will be in the open position. When the bars are separated, said shutters interlock with each other to form a closed and dirt proof joint, as described.

As shown clearly in Figs. 3 and 4, the shutter frame is adjusted so that the pivot portions 21 of the shutters rotate the rearmost projecting portions thereof and are positioned so that the same do not project beyond the radiator shell. When rocked through the medium of the rocking lever 29, said shutters swing rearwardly from said shell, as shown clearly in Fig. 4. The shutters, as shown in the same figure, forming the right half of the shutter construction are pivoted upon the left side of the shutter blank, the right edge thereof swinging rearwardly to open; while the shutters forming the left half of the shutter construction are pivoted upon the right edge thereof, and the left edge thereof swings rearwardly. Furthermore this construction deflects the air so that the same tends to pass through the radiator core and around the right and left sides of the same to cool the engine construction beneath the hood. By thus pivoting the shutter blanks upon their forwardly extending ends and swinging the opposite ends rearwardly to open said shutter construction, it is possible to provide rods extending vertically through the pivotal sockets. Said rods not only serve as pivots, but also reinforce said shutter construction and serve to protect the radiator core from casual injury.

From the foregoing it will be understood that there is provided in combination with the usual radiator core, a radiator shell and an improved shutter construction, which not only presents an ornamental appearance, but is useful in the manner described.

It will be understood by those skilled in the art that various modifications of the several means hereinbefore disclosed are possible and the invention is not to be limited by the detail with which the same has been described.

The invention claimed is:

1. In a radiator shutter construction the combination of a radiator shell provided with the usual air opening and spaced from a radiator core adjacent said opening, a shutter frame comprising a plurality of pivoted shutters and means for swinging the same, and adjustable means supporting said shutter frame upon the interior of said radiator shell adjacent the air opening.

2. In a radiator shutter construction the combination of a radiator core, a radiator shell positioned forwardly of said core to inclose the same and provided with a central air opening therein, a shutter frame positioned adjacent said air opening in said space, said shutter frame comprising a plurality of pivot rods and shutter blanks pivotally supported at one edge by said rods and adapted to swing inwardly, said rods at all times being positioned forwardly of said shutters and said radiator core and adjacent said air opening to protect the core from casual injury, means associated with said shutters to swing the same, and adjustable means for securing said shutter frame to said radiator shell and rearwardly thereof adjacent said air opening so as to be invisible therethrough.

3. In a radiator shutter construction the combination of a radiator shell provided with an air opening adjacent a radiator core, a plurality of shutter blades pivoted adjacent said air opening to control the air passing therethrough, and means associated with said shutters for actuating the same so that one-half of said shutters will deflect the air passing through one-half of the air opening in one direction and the other half of said shutters will deflect the remaining air in a direction opposite to that first mentioned.

4. In a radiator shutter construction the combination of a radiator shell provided with an air opening adjacent the radiator core, a plurality of pivoted shutter blanks, one-half of said shutter blanks being pivoted upon one edge and the other edge of said shutters being adapted to swing inwardly, the other half of said shutters being pivoted upon the opposite edge of said shutter blanks and having the opposite edge thereof adapted to swing inwardly, and means associated with each half of said shutters for swinging the same.

5. In a radiator shutter construction the combination of a radiator shell provided with an air opening adjacent the radiator core, a plurality of pivoted shutter blanks, one-half of said shutter blanks being pivoted upon one edge and the other edge of said shutters being adapted to swing inwardly, the other half of said shutters being pivoted upon the opposite edge of said shutter blanks and having the opposite edge thereof adapted to swing inwardly, and means associated with each half of said shutters for simultaneously swinging the same.

In witness whereof, we have hereunto affixed our signatures.

LUTHER A. MENGES.
WARREN W. SIMPSON.